US011766922B2

(12) United States Patent
Jocz

(10) Patent No.: US 11,766,922 B2
(45) Date of Patent: *Sep. 26, 2023

(54) DEPLOYABLE BED COVER FOR A VEHICLE AND ASSOCIATED DEPLOYMENT METHOD

(71) Applicant: Rivian IP Holdings, LLC, Plymouth, MI (US)

(72) Inventor: Michael Jocz, Novi, MI (US)

(73) Assignee: Rivian IP Holdings, LLC, Plymouth, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/591,308

(22) Filed: Feb. 2, 2022

(65) Prior Publication Data

US 2022/0161640 A1  May 26, 2022

Related U.S. Application Data

(63) Continuation of application No. 16/904,809, filed on Jun. 18, 2020, now Pat. No. 11,267,321.

(51) Int. Cl.
*B60J 7/06* (2006.01)
*B60J 7/057* (2006.01)
*B60J 7/04* (2006.01)

(52) U.S. Cl.
CPC .............. *B60J 7/068* (2013.01); *B60J 7/041* (2013.01); *B60J 7/0573* (2013.01); *B60W 2520/10* (2013.01)

(58) Field of Classification Search
CPC ... B60J 7/041; B60J 7/068; B60J 7/085; B60J 7/0573; B60J 7/102; B60J 7/10; B60J 7/104; B60J 7/1607

USPC .............. 296/180.1, 100.17, 100.18, 100.05
See application file for complete search history.

(56) References Cited

U.S. PATENT DOCUMENTS

| 4,496,184 A | 1/1985 | Byrd et al. |
| 4,518,194 A | 5/1985 | Kirkham et al. |
| 4,795,206 A | 1/1989 | Adams |
| 5,110,172 A | 5/1992 | Ney et al. |
| 5,232,259 A | 8/1993 | Booker |

(Continued)

OTHER PUBLICATIONS

Retrax; Retractable Bed Cover; Jan. 1, 1996.

*Primary Examiner* — Jason S Morrow
(74) *Attorney, Agent, or Firm* — Clements Bernard Walker; Christopher L. Bernard

(57) ABSTRACT

A bed cover for a vehicle that may be deployed electromechanically, either on demand or automatically, when a vehicle operator so desires, when predetermined weather conditions are detected, when the vehicle reaches a predetermined speed or experiences predetermined operating conditions, and/or when predetermined aerodynamic drag conditions are detected. The bed cover is deployable from a stowed configuration to one or more use configurations. These use configurations may include a traditional horizontal bed cover and/or an angled "cap-style" bed cover, with the angled bed cover providing enhanced aerodynamic drag reduction characteristics. A vehicle control module and camera, sensor, and/or stop trigger are used to ensure that is safe to deploy and use the bed cover, without negatively impacting an item, animal, or person present in the bed or rear cargo space of the vehicle.

20 Claims, 5 Drawing Sheets

(56) References Cited

U.S. PATENT DOCUMENTS

| | | | |
|---|---|---|---|
| 5,722,714 A | | 3/1998 | Vallerand |
| 5,735,567 A | | 4/1998 | Mora |
| 5,743,589 A | | 4/1998 | Felker |
| 6,491,332 B2 | * | 12/2002 | De Ceuster ............. B60R 5/047 296/37.16 |
| 6,846,032 B2 | * | 1/2005 | de Gaillard ............. B60J 7/067 296/100.09 |
| 6,962,388 B1 | | 11/2005 | Flores |
| 10,005,501 B2 | * | 6/2018 | Povinelli ................ B60J 7/0573 |
| 2004/0189047 A1 | * | 9/2004 | Barry ................ B62D 33/0273 296/180.1 |
| 2010/0045069 A1 | | 2/2010 | Koba |
| 2017/0101138 A1 | | 4/2017 | Povinelli et al. |
| 2018/0029597 A1 | | 2/2018 | Gage et al. |
| 2018/0339733 A1 | | 11/2018 | Frederick et al. |
| 2019/0002039 A1 | | 1/2019 | Cha et al. |
| 2020/0101823 A1 | | 4/2020 | Bernardo |
| 2020/0122557 A1 | | 4/2020 | Jung |
| 2020/0353803 A1 | | 11/2020 | Pompili et al. |
| 2020/0361296 A1 | | 11/2020 | Carter et al. |
| 2021/0354537 A1 | * | 11/2021 | Kneifl ................ B62D 33/0273 |

\* cited by examiner

DEPLOYABLE BED COVER FOR A VEHICLE AND ASSOCIATED DEPLOYMENT METHOD

CROSS-REFERENCE TO RELATED APPLICATION

The present disclosure claims the benefit of priority of co-pending U.S. patent application Ser. No. 16/904,809, filed on Jun. 18, 2020, and entitled "DEPLOYABLE BED COVER FOR A VEHICLE AND ASSOCIATED DEPLOYMENT METHOD," the contents of which are incorporated in full by reference herein.

INTRODUCTION

The present disclosure relates generally to the automotive field. More particularly, the present disclosure relates to a deployable bed cover for a vehicle and an associated deployment method. The statements in this introduction merely provide background information related to the present disclosure and may not constitute prior art.

Many pickup trucks and the like utilize a bed cover (also referred to, more generally, as a tonneau cover) to cover, secure, and protect items stored in the bed or rear cargo space thereof. Such bed covers have the advantage of reducing aerodynamic drag when used. However, continuous use can be cumbersome, decreasing the overall utility of the covered bed or rear cargo space. Selective use is preferable, but impractical as it is difficult and time consuming for a vehicle operator to repeatedly manually open and close, or remove (and stow or store) and replace, a bed cover.

Thus, selective use of a bed cover is desirable in the event that items stored in the bed or rear cargo space of a vehicle need to be covered, secured, or protected, sheltered from inclement weather, and/or when it is desirable to reduce aerodynamic drag of the vehicle. It will be readily apparent to those or ordinary skill in the art that this introduction is provided as helpful context and environment only, and that the concepts associated with the deployable bed cover and deployment method of the present disclosure may be implemented in other contexts and environments equally.

BRIEF SUMMARY

In one illustrative embodiment, the present disclosure provides a deployable bed cover assembly for a vehicle, including: a bed cover structure that is deployable from a first stowed configuration one or more of adjacent to and within a rear cargo space of the vehicle to a second covered configuration above and one of partially and wholly enclosing the rear cargo space of the vehicle; and a deployment mechanism operable for deploying the bed cover structure from the first stowed configuration to the second covered configuration with respect to the rear cargo space of the vehicle. The bed cover structure includes one or more of: a flexible planar structure; a rigid planar structure; and a plurality of coupled rigid panel structures. The deployment mechanism includes one or more of: a roller mechanism operable for extending the bed cover structure along a pair of track structures disposed on opposed sides of the rear cargo space of the vehicle; an extension mechanism operable for translating the bed cover structure above and one of partially and wholly enclosing the rear cargo space of the vehicle; and an expansion mechanism operable for expanding the bed cover structure along the pair of track structures disposed on the opposed sides of the rear cargo space of the vehicle. The deployable bed cover assembly further includes one or more of: an operator interface coupled to a controller and the deployment mechanism operable for allowing an operator to control deployment of the bed cover structure on demand; a vehicle speed sensor coupled to the controller and the deployment mechanism operable for initiating the deployment of the bed cover structure when the vehicle reaches a predetermined speed; an environmental sensor coupled to the controller and the deployment mechanism operable for initiating the deployment of the bed cover structure when the vehicle experiences a predetermined environmental condition; and an operator presence sensor coupled to the controller and the deployment mechanism operable for initiating the deployment of the bed cover structure when it is determined that the operator withdraws from the vehicle. The deployable bed cover assembly further includes a controller coupled to one or more of a camera, a sensor, and a stop trigger operable for detecting one of an object, an animal, and a person disposed in the rear cargo space of the vehicle that would interfere with deployment of the bed cover structure from the first stowed configuration to the second covered configuration and preventing deployment of the bed cover structure from the first stowed configuration to the second covered configuration accordingly. Optionally, the vehicle includes a pickup truck and the rear cargo space includes a bed of the pickup truck.

In another illustrative embodiment, the present disclosure provides a vehicle, including: a bed including a rear tailgate closure; a bed cover structure that is deployable from a first stowed configuration one or more of adjacent to and within the bed to a second covered configuration above and one of partially and wholly enclosing the bed; and a deployment mechanism operable for deploying the bed cover structure from the first stowed configuration to the second covered configuration with respect to the bed. The bed cover structure includes one or more of: a flexible planar structure; a rigid planar structure; and a plurality of coupled rigid panel structures. The deployment mechanism includes one or more of: a roller mechanism operable for extending the bed cover structure along a pair of track structures disposed on opposed sides of the bed; an extension mechanism operable for translating the bed cover structure above and one of partially and wholly enclosing the bed; and an expansion mechanism operable for expanding the bed cover structure along the pair of track structures disposed on the opposed sides of the bed. The vehicle further includes one or more of: an operator interface coupled to a controller and the deployment mechanism operable for allowing an operator to control deployment of the bed cover structure on demand; a vehicle speed sensor coupled to the controller and the deployment mechanism operable for initiating the deployment of the bed cover structure when the vehicle reaches a predetermined speed; an environmental sensor coupled to the controller and the deployment mechanism operable for initiating the deployment of the bed cover structure when the vehicle experiences a predetermined environmental condition; and an operator presence sensor coupled to the controller and the deployment mechanism operable for initiating the deployment of the bed cover structure when it is determined that the operator withdraws from the vehicle. The vehicle further includes a controller coupled to one or more of a camera, a sensor, and a stop trigger operable for detecting one of an object, an animal, and a person disposed in the bed that would interfere with deployment of the bed cover structure from the first stowed configuration to the second covered configuration and preventing deployment of the bed cover structure from the first stowed configuration to the second covered configuration accordingly.

In a further illustrative embodiment, the present disclosure provides a method for deploying a bed cover structure with respect to a rear cargo space of a vehicle, including: deploying the bed cover structure from a first stowed configuration one or more of adjacent to and within the rear cargo space of the vehicle to a second covered configuration above and one of partially and wholly enclosing the rear cargo space of the vehicle via actuation of a deployment mechanism responsive to one or more of an operator command, a predetermined vehicle condition, a predetermined environmental condition, and a predetermined operator condition. The bed cover structure includes one or more of: a flexible planar structure; a rigid planar structure; and a plurality of coupled rigid panel structures. The deployment mechanism includes one or more of: a roller mechanism operable for extending the bed cover structure along a pair of track structures disposed on opposed sides of the rear cargo space of the vehicle; an extension mechanism operable for translating the bed cover structure above and one of partially and wholly enclosing the rear cargo space of the vehicle; and an expansion mechanism operable for expanding the bed cover structure along the pair of track structures disposed on the opposed sides of the rear cargo space of the vehicle. The operator command is received from an operator interface coupled to a controller and the deployment mechanism operable for allowing an operator to control deployment of the bed cover structure on demand. The predetermined vehicle condition is received from a vehicle speed sensor coupled to the controller and the deployment mechanism operable for initiating the deployment of the bed cover structure when the vehicle reaches a predetermined speed. The predetermined environmental condition is received from an environmental sensor coupled to the controller and the deployment mechanism operable for initiating the deployment of the bed cover structure when the vehicle experiences a predetermined environmental condition. The predetermined operator condition is received from an operator presence sensor coupled to the controller and the deployment mechanism operable for initiating the deployment of the bed cover structure when it is determined that the operator withdraws from the vehicle. The method further includes detecting one of an object, an animal, and a person disposed in the rear cargo space of the vehicle that would interfere with deployment of the bed cover structure from the first stowed configuration to the second covered configuration via a controller coupled to one or more of a camera, a sensor, and a stop trigger and preventing deployment of the bed cover structure from the first stowed configuration to the second covered configuration accordingly.

The foregoing brief summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIG. 6 is a block diagram of a server which may be used in the cloud-based system of FIG. 5 or the like.

FIG. 7 is a block diagram of a user device which may be used in the cloud-based system of FIG. 5 or the like.

DETAILED DESCRIPTION

Figure 1:
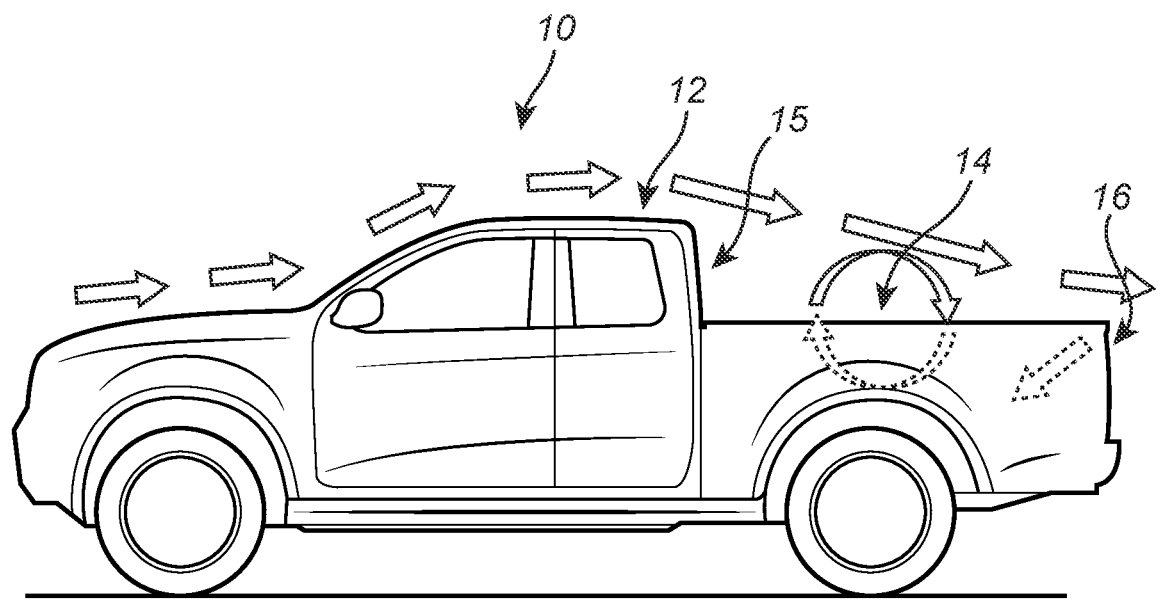
FIG. 1 is a schematic diagram illustrating the aerodynamic drag generated by the open bed of a pickup truck.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present disclosure provides a bed cover for a vehicle that may be deployed electromechanically, either on demand or automatically, when a vehicle operator so desires, when predetermined weather conditions are detected, when the vehicle reaches a predetermined speed or experiences predetermined operating conditions, and/or when predetermined aerodynamic drag conditions are detected. The bed cover is deployable from a stowed configuration to one or more use configurations. These use configurations may include a traditional horizontal bed cover and/or an angled "cap-style" bed cover, with the angled bed cover providing enhanced aerodynamic drag reduction characteristics. A vehicle control module and camera, sensor, and/or stop trigger are used to ensure that is safe to deploy and use the bed cover, without negatively impacting an item, animal, or person present in the bed or rear cargo space of the vehicle.

Referring now specifically to FIG. 1, the aerodynamic drag on a vehicle 10 is illustrated. In this case, the vehicle 10 is a pickup truck and the aerodynamic drag is exacerbated by air flowing over the roof 12 of the vehicle 10, entering the bed 14 of the vehicle 10, and encountering the tailgate 16 of the vehicle 10, forming an area of turbulent airflow in the bed 14 in front of the tailgate 16. This problem is especially acute in electric vehicles, for which is desirable to minimize aerodynamic drag and maximize battery range. In general, bed covers have the advantage of reducing aerodynamic drag when used. However, as mentioned above, continuous use can be cumbersome, decreasing the overall utility of the covered bed or rear cargo space. Thus, selective use is preferable, but impractical as it is difficult and time consuming for a vehicle operator to repeatedly manually open and close, or remove (and stow or store) and replace, a bed cover. To remedy this problem, the present disclosure provides a bed cover for a vehicle that is selectively deployable electromechanically, either on demand or automatically, in the event that items stored in the bed or rear cargo space of the vehicle need to be covered, secured, or protected, sheltered from inclement weather, and/or when it is desirable to reduce aerodynamic drag of the vehicle.

Figure 2:
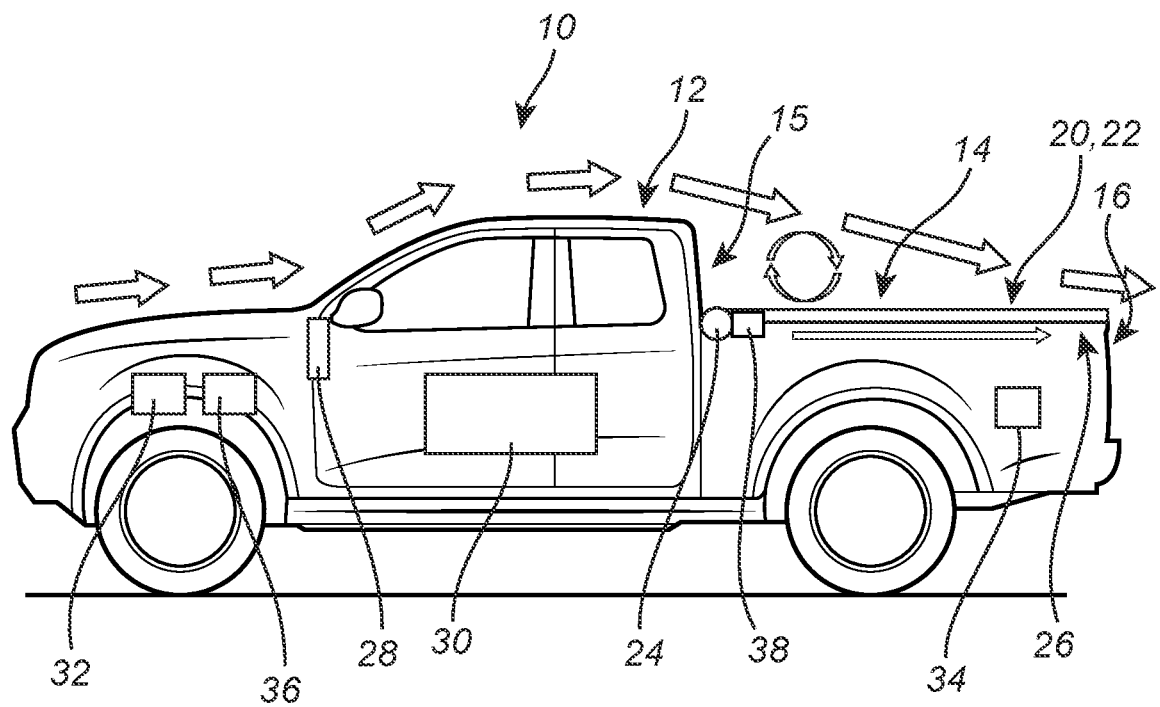
FIG. 2 is a schematic diagram illustrating the operation of one illustrative embodiment of the deployable horizontal bed cover of the present disclosure to reduce aerodynamic drag.

Referring now specifically to FIG. 2, in one illustrative embodiment, the present disclosure provides a deployable bed cover assembly 20 for a vehicle 10 that includes a bed cover structure 22 that is deployable from a first stowed configuration adjacent to or within the rear cargo space 14 of the vehicle 10 to a second covered configuration above and partially or wholly enclosing the rear cargo space 14 of the vehicle 10. In the illustrative embodiment illustrated, the bed cover structure 22 is a conventional horizontal bed cover structure disposed parallel to and spaced apart from a floor of the rear cargo space 14 of the vehicle 10 and extending side-to-side from the cab 15 to the tailgate 16. Extension and retraction of the bed cover structure 22 is actuated and controlled by a deployment mechanism 24 operable for deploying the bed cover structure 22 from the first stowed configuration to the second covered configuration with respect to the rear cargo space 14 of the vehicle 10.

The bed cover structure 22 includes a flexible planar structure, such as a polymeric or mesh fabric planar structure (with or without reinforcing ribs, struts, or other members) that is impervious to water and the elements, preferably with sufficient overall rigidity such that it resists unwanted buffeting at speed, for example. Here, the flexible planar structure could be stowed in a rolled configuration at the front or back (or side) of the rear cargo space 14, either exposed or in a storage compartment, and unrolled across the rear cargo space 14 when desired. Alternatively, the bed cover structure 22 includes a rigid planar structure, such as a polymeric or fabric-and-frame planar structure (again with or without reinforcing ribs, struts, or other members) that is impervious to water and the elements, preferably with sufficient overall rigidity such that it resists unwanted buffeting at speed, for example. Here, the rigid planar structure could be stowed in a planar configuration at the front or back (or side) of the rear cargo space 14, in a storage compartment, and pivoted and/or translated across the rear cargo space 14 when desired. Alternatively, the bed cover structure 22 includes a plurality of coupled rigid panel structures, such as a polymeric or fabric-and-frame panel structures (again with or without reinforcing ribs, struts, or other members) that are impervious to water and the elements, preferably with sufficient overall rigidity such that it resists unwanted buffeting at speed, for example. The coupled panels may expand and contract via an accordion or telescoping movement. Here, the coupled panels could be stowed in a contracted configuration at the front or back (or side) of the rear cargo space 14, either exposed or in a storage compartment, and expanded across the rear cargo space 14 when desired. Other suitable bed cover structures 22 and methods of storage and deployment will be readily apparent to those of ordinary skill in the art and may be used equally.

The deployment mechanism 24 includes a roller mechanism including an electric motor and a spool or shaft operable for extending/retracting the flexible bed cover structure 22 along a pair of track structures 26 disposed on opposed sides of the rear cargo space 14 of the vehicle 10. Alternatively, the deployment mechanism 24 includes an extension mechanism including a translating/pivoting mechanism including a translating/pivoting arm operable for translating/pivoting the rigid bed cover structure 22 above and partially or wholly enclosing/exposing the rear cargo space 14 of the vehicle 10. Alternatively, the deployment mechanism 24 includes an expansion mechanism including a translating mechanism including a translating arm/wire operable for expanding/contracting the panels of the bed cover structure 22 along the pair of track structures 26 disposed on the opposed sides of the rear cargo space 14 of the vehicle 10.

Figure 3:
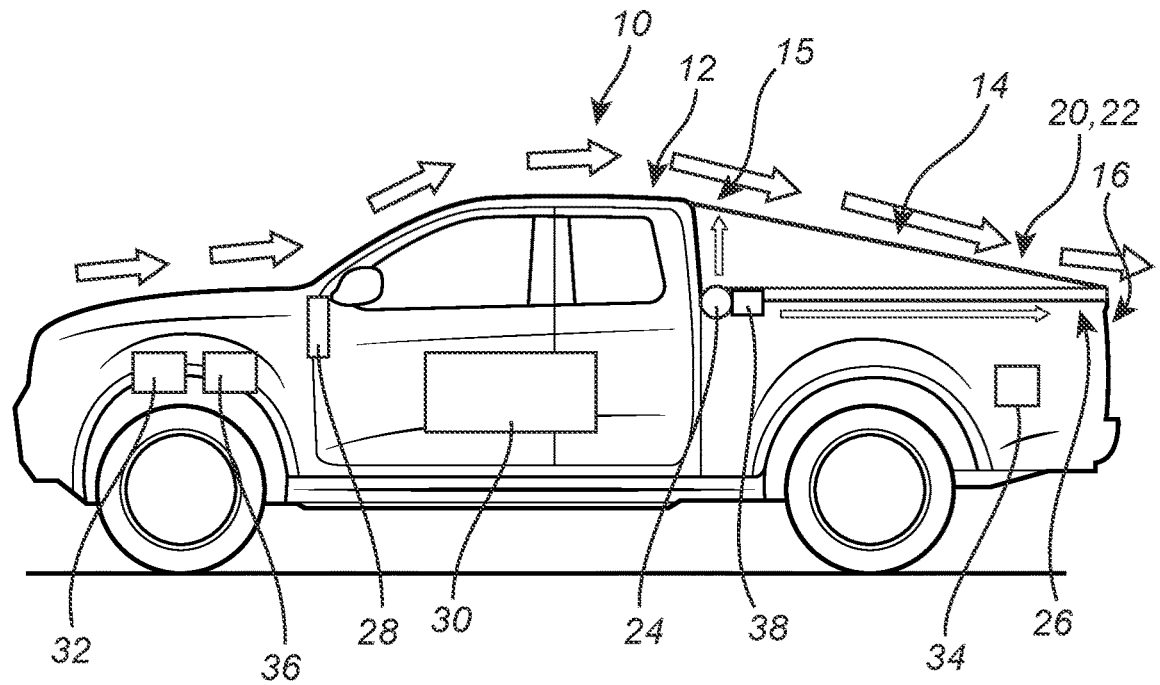
FIG. 3 is a schematic diagram illustrating the operation of one illustrative embodiment of the deployable angled "cap-style" bed cover of the present disclosure to further reduce aerodynamic drag.

Again, in the second covered configuration, the bed cover structure 22 is disposed parallel to and spaced apart from the floor of the rear cargo space 14 of the vehicle 10. Optionally, the bed cover structure 22 is further deployable from the second covered configuration to a third angled configuration in which the bed cover structure 22 is disposed at an angle to and spaced apart from the floor of the rear cargo space 14 of the vehicle 10. This third configuration proves a "capstyle" bed cover 22 that provides a gradient transition from the roof 12 of the vehicle 10 to the tailgate 16, and is illustrated in FIG. 3. In the third configuration, the end of the bed cover structure 22 adjacent to the roof 12 of the vehicle 10 is elevated with respect to the floor of the rear cargo space 14 by the deployment mechanism 24 including the extension mechanism including the translating/pivoting mechanism including the translating/pivoting arm operable to translate/pivot the bed cover structure 22, as provided above with regard to the embodiment of FIG. 2. This third configuration increases the available storage space under the bed cover structure 22 when deployed, and further improves the aerodynamic drag characteristics of the bed cover assembly 20 when utilized. It should be noted that the bed cover structure 22 may be selectively deployed from the first configuration to the second configuration to the third configuration, or the bed cover structure 22 may be deployed from the first configuration directly to the third configuration, provided that the deployment mechanism 24 is arranged and configured to accommodate such angled deployment.

Referring now specifically to FIGS. 2 and 3, the deployable bed cover assembly 20 further includes one or more of: an operator interface 28 coupled to a controller 30 and the deployment mechanism 24 operable for allowing an operator to control deployment of the bed cover structure 22 on demand; a vehicle speed sensor 32 coupled to the controller 30 and the deployment mechanism 24 operable for initiating the deployment of the bed cover structure 22 when the vehicle 10 reaches a predetermined speed; an environmental sensor 34 coupled to the controller 30 and the deployment mechanism 24 operable for initiating the deployment of the bed cover structure 22 when the vehicle 10 experiences a predetermined environmental condition; and an operator presence sensor 36 coupled to the controller 30 and the deployment mechanism 24 operable for initiating the deployment of the bed cover structure 22 when it is determined that the operator withdraws from the vehicle 10. By way of example, the operator may be able to deploy the bed cover structure on demand, and/or the bed cover structure 22 may be deployed automatically when the vehicle 10 reaches highway speeds, and/or the bed cover structure 22 may be deployed automatically when the vehicle 10 experiences freezing temperatures or is exposed to rain, sleet, or snow. Optionally, the bed cover structure 22 may be deployed automatically when a seat or door sensor or an interior or exterior camera and associated logic determine that the operator has left the vehicle. This could also be determined via the withdrawal of a near-field enabled device, such as a mobile phone. Other suitable deployment actuation mechanisms and methods will be readily apparent to those of ordinary skill in the art and may be used equally.

The deployable bed cover assembly 20 further includes one or more of a camera, a sensor, and a stop trigger 38 coupled to the controller 30 operable for detecting one of an object, an animal, and a person disposed in the rear cargo space 14 of the vehicle 10 that would interfere with deployment of the bed cover structure 22 from the first stowed configuration to the second covered configuration (and/or the third covered configuration) and preventing deployment of the bed cover structure 22 from the first stowed configuration to the second covered configuration (and/or the third covered configuration) accordingly. For example, a bed camera could be used to detect obstructions that would prevent, halt, and/or reverse deployment of the bed cover structure 22. Likewise, a bed cover motor electrical spike sensor could be used to detect obstructions that contact the deploying bed cover structure 22 and would prevent, halt, and/or reverse deployment of the bed cover structure 22. Likewise, a tailgate pinch sensor could be used to detect obstructions that contact the deploying bed cover structure 22 and would prevent, halt, and/or reverse deployment of the bed cover structure 22. Other suitable safety stop mechanisms and methods will be readily apparent to those of ordinary skill in the art and may be used equally.

Figure 4:
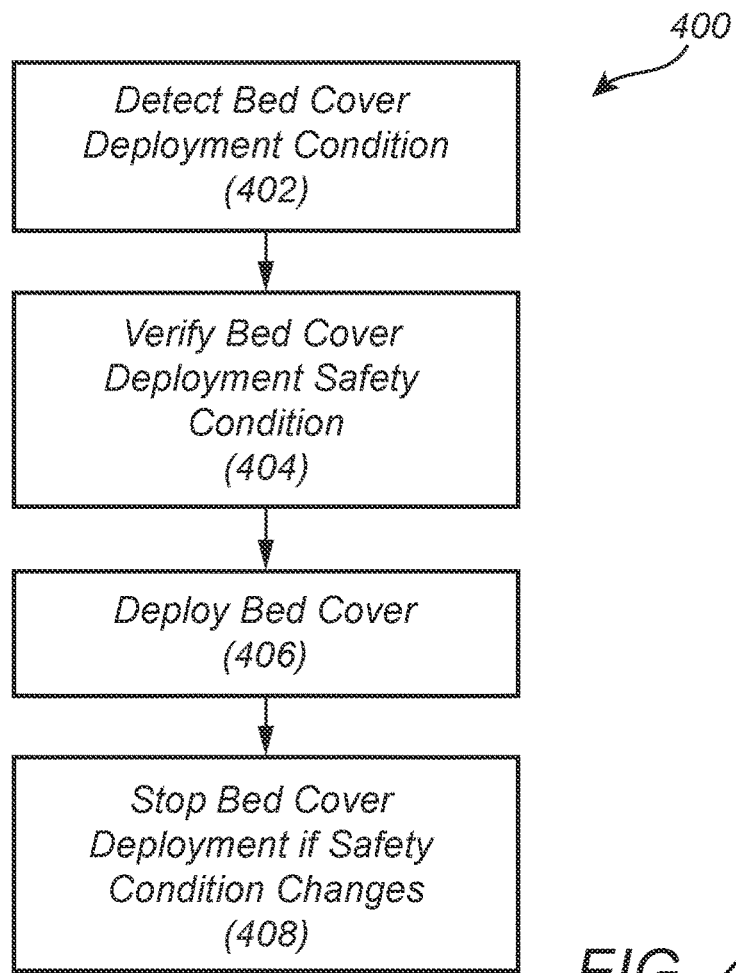
FIG. 4 is a flowchart illustrating one illustrative embodiment of the method for deploying the deployable bed cover of the present disclosure.

FIG. 4 illustrates one illustrative embodiment of the bed cover deployment method 400 of the present disclosure. The controller 30 (FIGS. 2 and 3) first detects a bed cover deployment condition 402, whether involving an operator request or automatic. The controller 30 the verifies a bed cover deployment safety condition 404 using the various cameras, sensors, and stop triggers of the vehicle. If an unsafe deployment is observed or detected, deployment of the bed cover structure 22 (FIGS. 2 and 3) is refused or reversed. If everything is safe, the controller 30 deploys the bed cover structure 22 406 using the deployment mechanism 24 (FIGS. 2 and 3). Again, bed cover structure deployment is halted and/or reversed is the monitored safety condition changes 408, or if the deployment command indication changes.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 5:
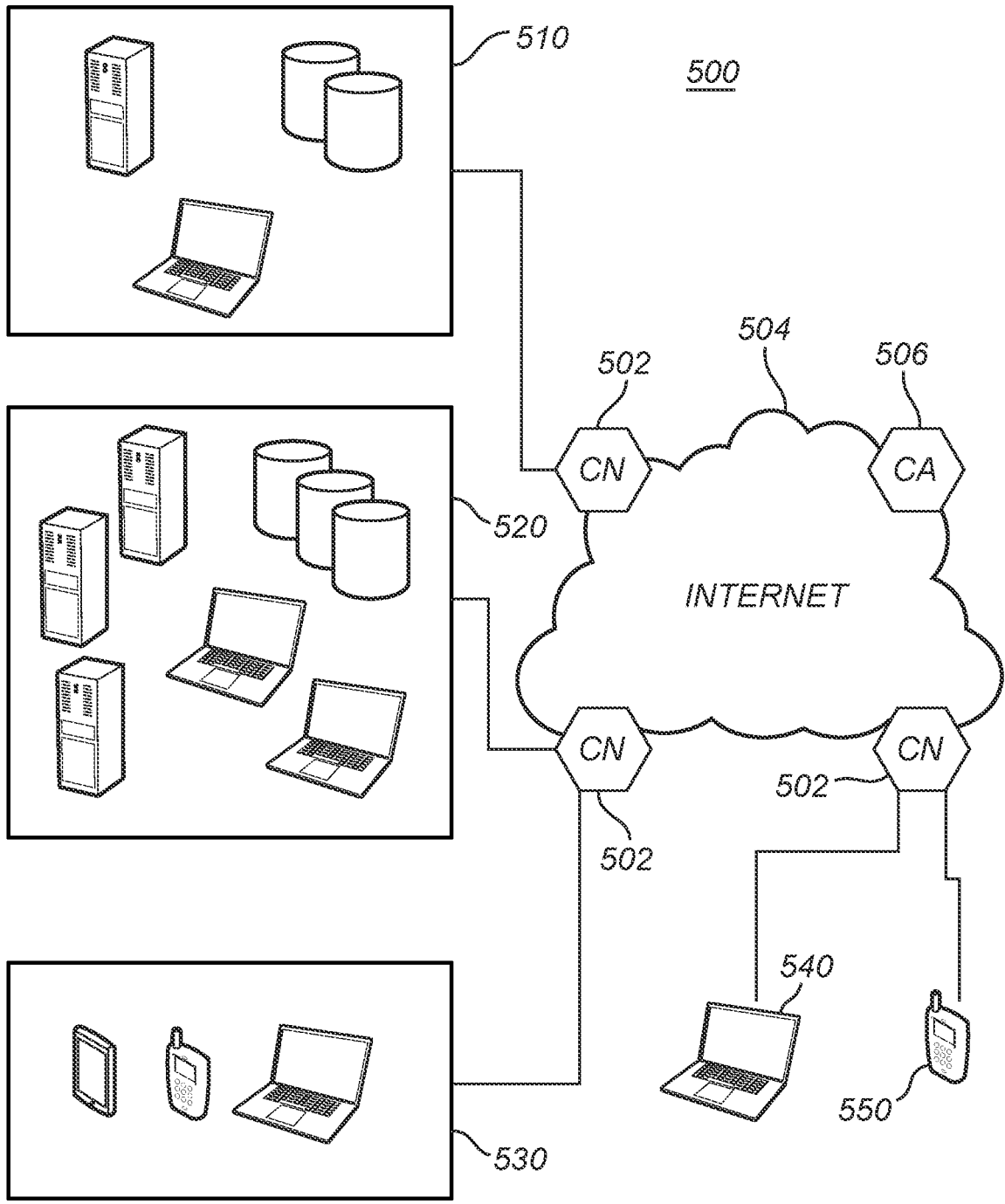
FIG. 5 is a network diagram of a cloud-based system for implementing various cloud-based services of the present disclosure.
Figure 6:
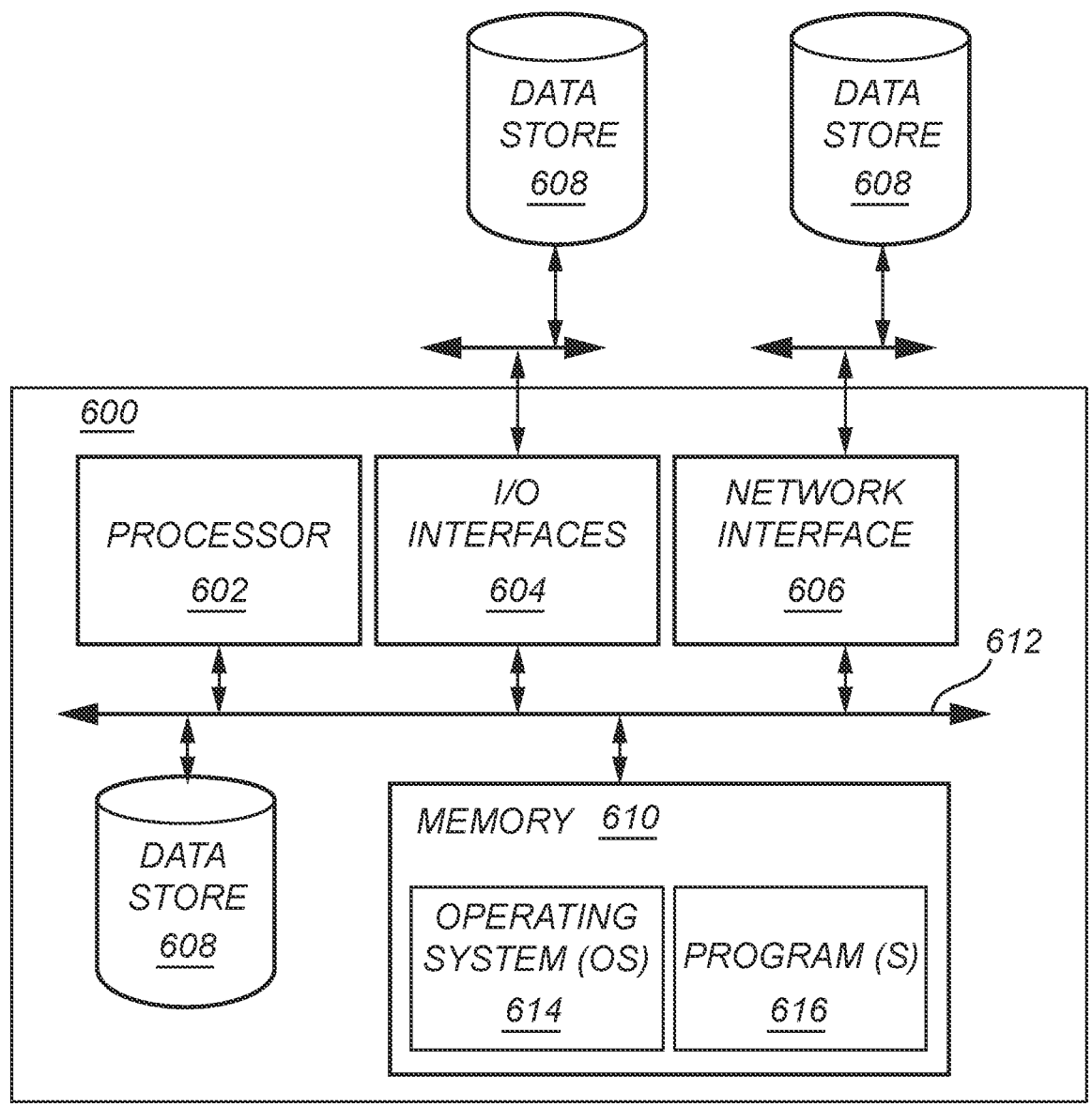

FIG. 5 is a network diagram of a cloud-based system 500 for implementing various cloud-based services of the present disclosure. The cloud-based system 500 includes one or more cloud nodes (CNs) 502 communicatively coupled to the Internet 504 or the like. The cloud nodes 502 may be implemented as a server 600 (as illustrated in FIG. 6) or the like and can be geographically diverse from one another, such as located at various data centers around the country or globe. Further, the cloud-based system 500 can include one or more central authority (CA) nodes 506, which similarly can be implemented as the server 600 and be connected to the CNs 502. For illustration purposes, the cloud-based system 500 can connect to a regional office 510, headquarters 520, various employee's homes 530, laptops/desktops 540, and mobile devices 550, each of which can be communicatively coupled to one of the CNs 502. These locations 510, 520, and 530, and devices 540 and 550 are shown for illustrative purposes, and those skilled in the art will recognize there are various access scenarios to the cloud-based system 500, all of which are contemplated herein. The devices 540 and 550 can be so-called road warriors, i.e., users off-site, on-the-road, etc. The cloud-based system 500 can be a private cloud, a public cloud, a combination of a private cloud and a public cloud (hybrid cloud), or the like.

Again, the cloud-based system 500 can provide any functionality through services such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 510, 520, and 530 and devices 540 and 550. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 500 is replacing the conventional deployment model. The cloud-based system 500 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application necessarily required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 500 is illustrated herein as one example embodiment of a cloud-based system, and those of ordinary skill in the art will recognize the systems and methods described herein are not necessarily limited thereby.

FIG. 6 is a block diagram of a server 600, which may be used in the cloud-based system 500 (FIG. 5), in other systems, or standalone. For example, the CNs 502 (FIG. 5) and the central authority nodes 506 (FIG. 5) may be formed as one or more of the servers 600. The server 600 may be a digital computer that, in terms of hardware architecture, generally includes a processor 602, input/output (I/O) interfaces 604, a network interface 606, a data store 608, and memory 610. It should be appreciated by those of ordinary skill in the art that FIG. 6 depicts the server 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 may be, for example, but is not limited to, one or more buses or other wired or wireless connections, as is known in the art. The local interface 612 may have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 may be any custom made or commercially available processor, a central processing unit (CPU), an auxiliary processor among several processors associated with the server 600, a semiconductor-based microprocessor (in the form of a microchip or chipset), or generally any device for executing software instructions. When the server 600 is in operation, the processor 602 is configured to execute software stored within the memory 610, to communicate data to and from the memory 610, and to generally control operations of the server 600 pursuant to the software instructions. The I/O interfaces 604 may be used to receive user input from and/or for providing system output to one or more devices or components.

The network interface 606 may be used to enable the server 600 to communicate on a network, such as the Internet 504 (FIG. 5). The network interface 606 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 606 may include address, control, and/or data connections to enable appropriate communications on the network. A data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media. In one example, the data store 608 may be located internal to the server 600, such as, for example, an internal hard drive connected to the local interface 612 in the server 600. Additionally, in another embodiment, the data store 608 may be located external to the server 600 such as, for example, an external hard drive connected to the I/O interfaces 604 (e.g., a SCSI or USB connection). In a further embodiment, the data store 608 may be connected to the server 600 through a network, such as, for example, a network-attached file server.

The memory 610 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 may incorporate electronic, magnetic, optical, and/or other types of storage media. Note that the memory 610 may have a distributed architecture, where various components are situated remotely from one another but can be accessed by the processor 602. The software in memory 610 may include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 7:
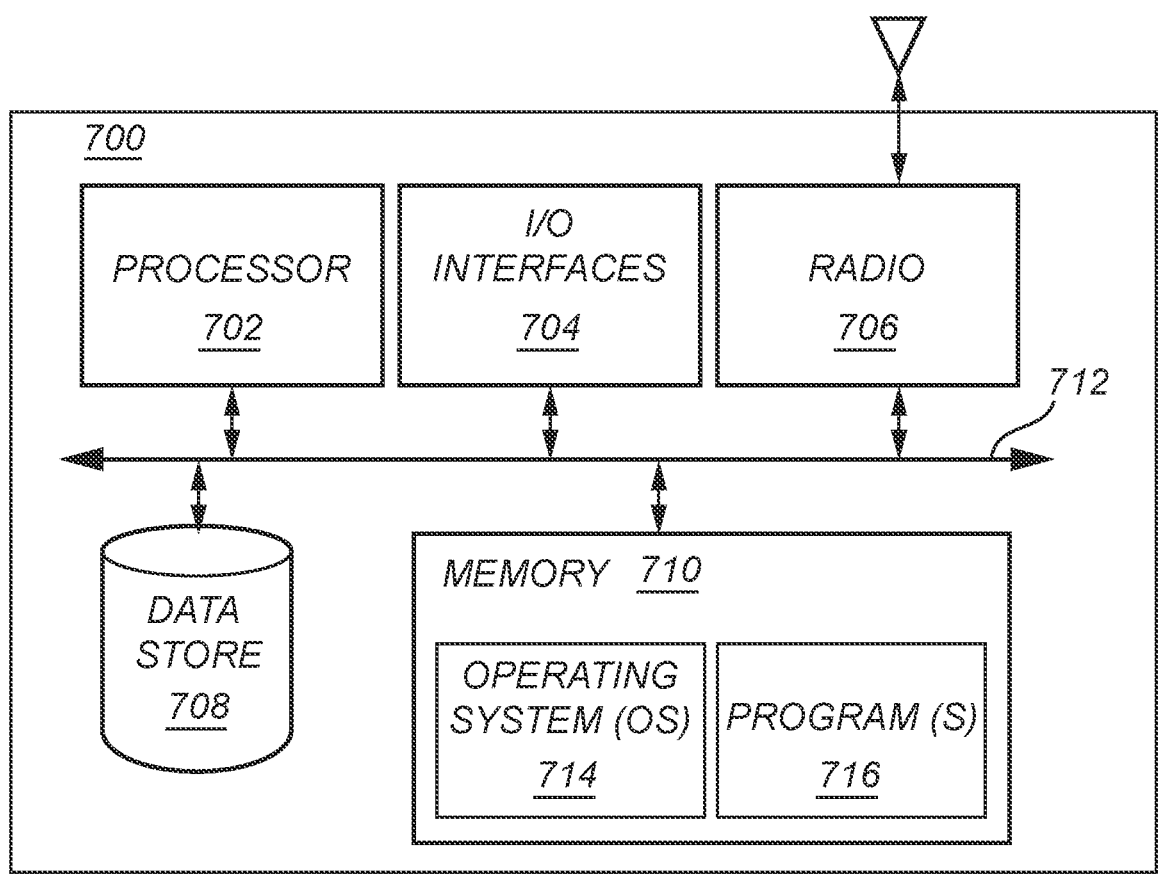

FIG. 7 is a block diagram of a user device 700, which may be used in the cloud-based system 500 (FIG. 5) or the like. Again, the user device 700 can be a smartphone, a tablet, a smartwatch, an Internet of Things (IoT) device, a laptop, a virtual reality (VR) headset, a vehicle control device or system, etc. The user device 700 can be a digital device that, in terms of hardware architecture, generally includes a processor 702, I/O interfaces 704, a radio 706, a data store 708, and memory 710. It should be appreciated by those of ordinary skill in the art that FIG. 7 depicts the user device 700 in an oversimplified manner, and a practical embodiment may include additional components and suitably configured processing logic to support known or conventional operating features that are not described in detail herein. The components (702, 704, 706, 708, and 710) are communicatively coupled via a local interface 712. The local interface 712 can be, for example, but is not limited to, one or more buses or other wired or wireless connections, as is known in the art. The local interface 712 can have additional elements, which are omitted for simplicity, such as controllers, buffers (caches), drivers, repeaters, and receivers, among many others, to enable communications. Further, the local interface 712 may include address, control, and/or data connections to enable appropriate communications among the aforementioned components.

The processor 702 is a hardware device for executing software instructions. The processor 702 can be any custom made or commercially available processor, a CPU, an auxiliary processor among several processors associated with the user device 700, a semiconductor-based microprocessor (in the form of a microchip or chipset), or generally any device for executing software instructions. When the user device 700 is in operation, the processor 702 is configured to execute software stored within the memory 710, to communicate data to and from the memory 710, and to generally control operations of the user device 700 pursuant to the software instructions. In an embodiment, the processor 702 may include a mobile optimized processor such as optimized for power consumption and mobile applications. The I/O interfaces 704 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 706 enables wireless communication to an external access device or network. Any number of suitable wireless data communication protocols, techniques, or methodologies can be supported by the radio 706, including any protocols for wireless communication. The data store 708 may be used to store data. The data store 708 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 708 may incorporate electronic, magnetic, optical, and/or other types of storage media.

Again, the memory 710 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 710 may incorporate electronic, magnetic, optical, and/or other types of storage media. Note that the memory 710 may have a distributed architecture, where various components are situated remotely from one another, but can be accessed by the processor 702. The software in memory 710 can include one or more software programs, each of which includes an ordered listing of executable instructions for implementing logical functions. In the example of FIG. 7, the software in the memory 710 includes a suitable operating system 714 and programs 716. The operating system 714 essentially controls the execution of other computer programs and provides scheduling, input-output control, file and data management, memory management, and communication control and related services. The programs 716 may include various applications, add-ons, etc. configured to provide end user functionality with the user device 700. For example, example programs 716 may include, but not limited to, a web browser, social networking applications, streaming media applications, games, mapping and location applications, electronic mail applications, financial applications, and the like. In a typical example, the end-user typically uses one or more of the programs 716 along with a network such as the cloud-based system 500 (FIG. 5).

Thus, the present disclosure provides a bed cover for a vehicle that may be deployed electromechanically, either on demand or automatically, when a vehicle operator so desires, when predetermined weather conditions are detected, when the vehicle reaches a predetermined speed or experiences predetermined operating conditions, and/or when predetermined aerodynamic drag conditions are detected. The bed cover is deployable from a stowed configuration to one or more use configurations. These use configurations may include a traditional horizontal bed cover and/or an angled "cap-style" bed cover, with the angled bed cover providing enhanced aerodynamic drag reduction characteristics. A vehicle control module and camera, sensor, and/or stop trigger are used to ensure that is safe to deploy and use the bed cover, without negatively impacting an item, animal, or person present in the bed or rear cargo space of the vehicle.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A deployable bed cover assembly for a vehicle, comprising:
   a bed cover structure that is deployable from a stowed configuration to a first covered configuration and a second covered configuration, each of the first covered configuration and the second covered configuration at least partially enclosing a rear cargo space of the vehicle;
   a deployment mechanism operable to deploy the bed cover structure from the stowed configuration to the first covered configuration and the second covered configuration with respect to the rear cargo space of the vehicle; and
   a sensor coupled to a controller and the deployment mechanism operable to initiate and control the deployment of the bed cover structure from the stowed configuration to the first covered configuration and the second covered configuration based on the vehicle satisfying predetermined sensed conditions;
   wherein the bed cover structure is maintained in a selected one of the first covered configuration and the second covered configuration during subsequent vehicle use.

2. The deployable bed cover assembly of claim 1, further comprising one or more of a camera, a sensor, and a stop trigger coupled to the controller and the deployment mechanism operable to detect one of an object, an animal, and a person disposed in the rear cargo space of the vehicle that would interfere with deployment of the bed cover structure and prevent deployment of the bed cover structure accordingly.

3. The deployable bed cover assembly of claim 1, wherein:
   in the first covered configuration, the bed cover structure is disposed parallel to and spaced apart from a floor of the rear cargo space of the vehicle, and
   in the second covered configuration, the bed cover structure is disposed one of: (a) parallel to and spaced apart from the floor of the rear cargo space of the vehicle, but enclosing a different portion of the rear cargo space of the vehicle than in the first covered configuration, and (b) at an angle to and spaced apart from the floor of the rear cargo space of the vehicle.

4. The deployable bed cover assembly of claim 1, wherein the bed cover structure comprises one or more of:
   a flexible planar structure
   a rigid planar structure, and
   a plurality of coupled rigid panel structures.

5. The deployable bed cover assembly of claim 1, wherein the deployment mechanism comprises one or more of:
   a roller mechanism operable to extend the bed cover structure along a pair of track structures disposed on opposed sides of the rear cargo space of the vehicle,
   an extension mechanism operable to translate the bed cover structure above the floor of and one of partially and wholly enclosing the rear cargo space of the vehicle, and
   an expansion mechanism operable to expand the bed cover structure along the pair of track structures disposed on the opposed sides of the rear cargo space of the vehicle.

6. The deployable bed cover assembly of claim 1, wherein the sensor comprises one or more of:
   a vehicle speed sensor coupled to the controller and the deployment mechanism operable to initiate and control the deployment of the bed cover structure based on the vehicle reaching a predetermined speed,
   an environmental sensor coupled to the controller and the deployment mechanism operable to initiate and control the deployment of the bed cover structure based on the vehicle experiencing a predetermined environmental condition, and
   an operator presence sensor coupled to the controller and the deployment mechanism operable to initiate and control the deployment of the bed cover structure based on determining an operator presence in or absence from the vehicle.

7. The deployable bed cover assembly of claim 1, further comprising an operator interface coupled to the controller and the deployment mechanism operable to allow an operator to control deployment of the bed cover structure on demand.

8. The deployable bed cover assembly of claim 1, wherein the vehicle comprises a pickup truck and the rear cargo space comprises a bed of the pickup truck.

9. A vehicle, comprising:
   a bed comprising a rear tailgate closure and defining a rear cargo space of the vehicle;
   a bed cover structure that is deployable from a stowed configuration to a first covered configuration and a second covered configuration, each of the first covered configuration and the second covered configuration at least partially enclosing the rear cargo space of the vehicle;
   a deployment mechanism operable to deploy the bed cover structure from the stowed configuration to the first covered configuration and the second covered configuration with respect to the rear cargo space of the vehicle; and
   a sensor coupled to a controller and the deployment mechanism operable to initiate and control the deployment of the bed cover structure from the stowed configuration to the first covered configuration and the second covered configuration based on the vehicle satisfying predetermined sensed conditions;
   wherein the bed cover structure is maintained in a selected one of the first covered configuration and the second covered configuration with respect to the bed during subsequent vehicle use.

10. The vehicle of claim 9, further comprising one or more of a camera, a sensor, and a stop trigger coupled to the controller and the deployment mechanism operable to detect one of an object, an animal, and a person disposed in the rear cargo space of the vehicle that would interfere with deployment of the bed cover structure and prevent deployment of the bed cover structure accordingly.

11. The vehicle of claim 9, wherein:
in the first covered configuration, the bed cover structure is disposed parallel to and spaced apart from a floor of the rear cargo space of the vehicle, and
in the second covered configuration, the bed cover structure is disposed one of: (a) parallel to and spaced apart from the floor of the rear cargo space of the vehicle, but enclosing a different portion of the rear cargo space of the vehicle than in the first covered configuration, and (b) at an angle to and spaced apart from the floor of the rear cargo space of the vehicle.

12. The vehicle of claim 9, wherein the bed cover structure comprises one or more of:
a flexible planar structure;
a rigid planar structure; and
a plurality of coupled rigid panel structures.

13. The vehicle of claim 9, wherein the deployment mechanism comprises one or more of:
a roller mechanism operable to extend the bed cover structure along a pair of track structures disposed on opposed sides of the bed;
an extension mechanism operable to translate the bed cover structure above the floor of and one of partially and wholly enclosing the bed; and
an expansion mechanism operable to expand the bed cover structure along the pair of track structures disposed on the opposed sides of the bed.

14. The vehicle of claim 9, wherein the sensor comprises one or more of:
a vehicle speed sensor coupled to the controller and the deployment mechanism operable to initiate and control the deployment of the bed cover structure based on the vehicle reaching a predetermined speed,
an environmental sensor coupled to the controller and the deployment mechanism operable to initiate and control the deployment of the bed cover structure based on the vehicle experiencing a predetermined environmental condition, and
an operator presence sensor coupled to the controller and the deployment mechanism operable to initiate and control the deployment of the bed cover structure based on determining an operator presence in or absence from the vehicle.

15. The vehicle of claim 9, further comprising an operator interface coupled to the controller and the deployment mechanism operable to allow an operator to control deployment of the bed cover structure on demand.

16. A deployable bed cover assembly for a vehicle, comprising:
a bed cover structure that is deployable from a stowed configuration to a covered configuration, the covered configuration at least partially enclosing a rear cargo space of the vehicle, wherein the covered configuration comprises a first covered configuration and a second covered configuration;
a deployment mechanism operable to deploy the bed cover structure from the stowed configuration to the covered configuration with respect to the rear cargo space of the vehicle; and
a vehicle speed sensor coupled to a controller and the deployment mechanism operable to initiate and control the deployment of the bed cover structure from the stowed configuration to the first covered configuration and the second covered configuration based on the vehicle reaching predetermined speeds;
wherein the bed cover structure is maintained in a selected one of the first covered configuration and the second covered configuration during subsequent vehicle use.

17. The deployable bed cover assembly of claim 16, further comprising one or more of a camera, a sensor, and a stop trigger coupled to the controller and the deployment mechanism operable to detect one of an object, an animal, and a person disposed in the rear cargo space of the vehicle that would interfere with deployment of the bed cover structure and prevent deployment of the bed cover structure accordingly.

18. The deployable bed cover assembly of claim 16, wherein each of the first covered configuration and the second covered configuration at least partially enclose the rear cargo space of the vehicle, and wherein:
in the first covered configuration, the bed cover structure is disposed parallel to and spaced apart from a floor of the rear cargo space of the vehicle, and
in the second covered configuration, the bed cover structure is disposed one of: (a) parallel to and spaced apart from the floor of the rear cargo space of the vehicle, but enclosing a different portion of the rear cargo space of the vehicle than in the first covered configuration, and (b) at an angle to and spaced apart from the floor of the rear cargo space of the vehicle.

19. The deployable bed cover assembly of claim 16, further comprising one or more of:
an environmental sensor coupled to the controller and the deployment mechanism operable to initiate and control the deployment of the bed cover structure based on the vehicle experiencing a predetermined environmental condition; and
an operator presence sensor coupled to the controller and the deployment mechanism operable to initiate and control the deployment of the bed cover structure based on determining an operator presence in or absence from the vehicle.

20. The deployable bed cover assembly of claim 16, further comprising an operator interface coupled to the controller and the deployment mechanism operable to allow an operator to control deployment of the bed cover structure on demand.

* * * * *